Oct. 1, 1935. H. J. LIPHAM Re. 19,717

ELECTRIC COOKING APPLIANCE

Original Filed May 29, 1930 2 Sheets-Sheet 1

INVENTOR
Harvey J. Lipham
By W. B. Williamson Atty

Oct. 1, 1935. H. J. LIPHAM Re. 19,717

ELECTRIC COOKING APPLIANCE

Original Filed May 29, 1930 2 Sheets-Sheet 2

INVENTOR
Harvey J. Lipham
By W. W. Williamson
Atty.

Reissued Oct. 1, 1935

Re. 19,717

UNITED STATES PATENT OFFICE 19,717

ELECTRIC COOKING APPLIANCE

Harvey J. Lipham, Creamery, Pa.

Original No. 1,825,406, dated September 29, 1931, Serial No. 456,920, May 29, 1930. Application for reissue April 5, 1932, Serial No. 603,425

10 Claims. (Cl. 219—43)

My invention relates to new and useful improvements in an electric cooking appliance and has for its object to provide an exceedingly simple and effective device of this character which will increase the heating capacity and thereby reduce the consumption of electric current for a given amount of work.

Another object of the invention is to provide an adjustable bottom for the heating unit which bottom may itself be a heating element, said bottom being so mounted and controlled that it will serve as an automatic ejector for cooking utensils placed within the unit and also serve to limit the depth to which a cooking utensil may be inserted within the heating unit.

A further object of the invention is to provide an adjustable bottom heating element which may be selectively positioned at any desired elevation within the cooking appliance in order that said adjustable bottom heating element can or may be located in contact with or in proximity to the bottoms of different cooking utensils of varying depths, whereby the heat from said adjustable bottom heating element can, if desired, be utilized to its fullest extent because of its contiguousness to the bottom of the cooking utensil.

A still further object of the invention is to provide ribs adapted to act as guides for cooking utensils being inserted within the unit, said ribs also serving as supports for the wires of the side heating element and further serving as means for conducting and radiating heat to the cooking utensil and its contents.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Figure 1:
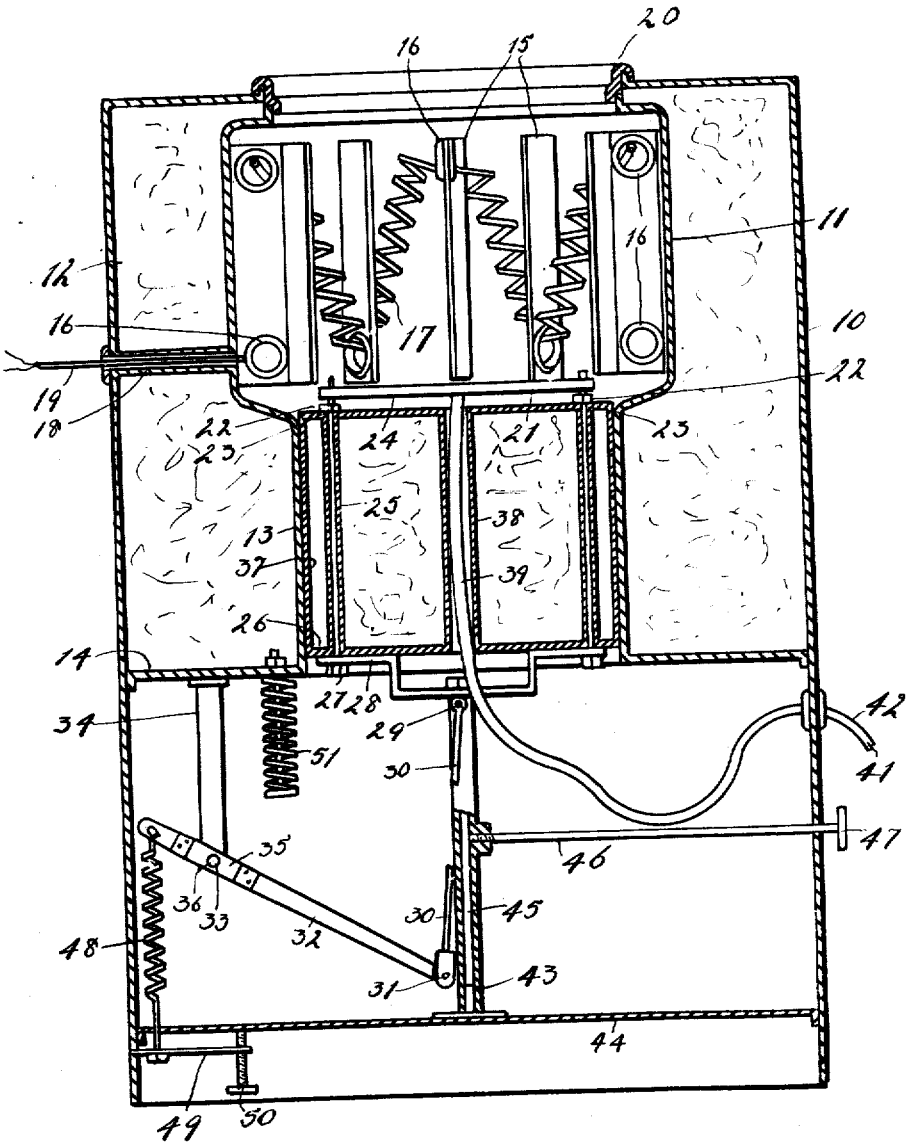
Fig. 1 is a central vertical section of an electric heater embodying my improvements.
Figure 2:
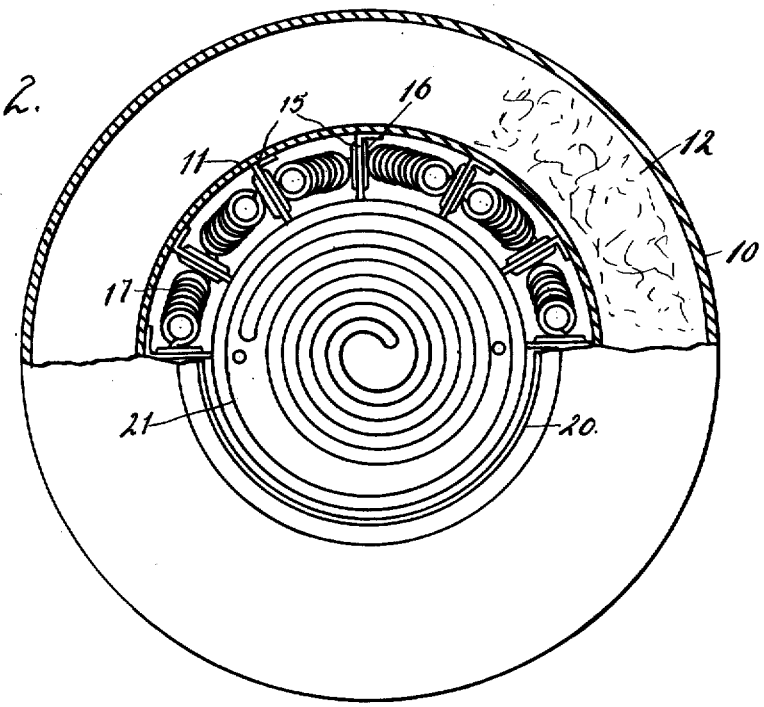
Fig. 2 is a plan view of Fig. 1, partly broken away to show the positions of the heating coils.

In carrying out the invention as herein embodied, 10 represents a casing in the form of a stove or device for combination with a stove and within this casing is secured the casing of the heating unit 11 which is of sufficiently less diameter than the casing 10 to form a space between said casings for introducing a heat non-conducting material as indicated at 12. The casing 11 has an extension 13 of reduced diameter between which and the wall of the casing 10 the heating non-conducting material is also packed, this extension being formed with or resting upon the horizontal partitions 14 secured within the casing 10, as clearly shown in Fig. 1.

Within the casing 11 are mounted a series of vertical ribs 15 having insulation plugs 16 set therein through which plugs are formed openings of sufficient size to permit the passage of the coils 17 of the side heating element and these coils are connected to the conductor 18 leading to the cord 19 through which the electric current is supplied to this element. The upper portion of the casing 11 is reduced to form the neck 20 which serves as an eye or opening through which the cooking utensils are inserted within the heating well formed by the casing 11 and the heating element therein.

Figure 3:
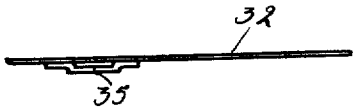
Fig. 3 is a detail edge view of the spring actuated lever for operating the adjustable bottom heating element.

21 represents the bottom heating element of the heating unit and is mounted upon the long bolts 22, said bolts having the shoulders 23 which latter rest upon the plate 24, said plate resting upon the tubes 25 which latter in turn rests upon the plate 26, all being held together by the nuts 27, run upon the lower ends of the bolts and these nuts likewise secure upon said bolts the yoke 28. This yoke has pivoted thereto at 29 the rod 30 which latter is pivoted at 31 to the lift bar 32, the latter being pivoted at 33 to the bracket 34 and for convenience in pivoting this bar to the bracket 34, I secure an off-set plate 35 to the bar as shown in Fig. 3, thus forming a socket which passes over the lower end of the bracket so that when the pivoting pin 36 is passed through the bracket and bar, said bar will be held against undue twisting action when functioning.

Between the plates 24 and 26 is secured a cylinder 37 which is packed with heat non-conducting material and the cylinder is adapted to slide up and down in the extension 13 to form a guide and housing for the element 21 and the parts connected therewith and also between these plates extends a tube 38 through which the conductor wires 39 pass leading from the heating element 21 and the connector 40, and to said connector is attached the flexible conductor cable 41 to which the cord 42 is connected for supplying the current to this heating element 21.

43 represents a hollow standard secured to the base plate 44 and in this standard the rod 42 is fitted to slide, said rod being connected to the yoke 28 and through the side of the standard is threaded the set screw 46 which is extended outside of the casing and has secured thereon the hand wheel 47 by which arrangement the rod 45 may be set in any adjustment for the purpose hereinafter set forth.

The short end of the lift bar 32 has attached thereto one end of the spring 48, the other end of said spring being attached to the adjusting strip 49, which latter is adapted to be adjusted by the screw 50 threaded through the outer end thereof, the upper end of the screw impinging upon the base plate 44 so that when said screw is properly manipulated, the tension on the spring 48 will be increased or decreased as occasion requires to enable said spring through the bar 32 and rod 30 to force the cylinder 37 and the parts connected therewith including the heating element 21 upward.

51 represents a buffer spring with which the lifting bar 32 is adapted to contact to limit the upward movement of this bar and to prevent undue shock at the time of such contact.

From the foregoing description, the operation of my improved electric cooking appliance will be actually as follows:—

The set screw being backed off, the heating element 21 will be elevated to a point within the heating unit by the action of the spring 48 and this position of the heating element 21 provides for the proper accommodation of shallow cooking utensils, such as frying pans and the like and when such a utensil is passed through the eye 20 into the well of the heating unit, its upper edge will be approximately flush with the upper edge of said eye, thus enclosing the heating unit after the manner of a cover, thereby retaining the heat within the well and permitting it to be practically completely absorbed by the cooking utensil and its contents.

When cooking utensils of greater depth than above referred to are inserted into the well through the eye, the heating element 21 will be forced downward against the action of the spring 48 until the upper edges of said utensils are brought approximately flush with the upper edge of the eye 20 when the rod 45 is clamped in position by the set screw 46, thus holding the heating element 21 in this position.

When the cooking utensil is to be removed, the releasing of the set screw 46 will bring about the elevation of the heating element 21, thus raising the cooking utensil so that it can be easily lifted off of the cooking appliance and while the adjustable bottom heating element is at the top of the well, said bottom heating element will act as a closure for the top of the well to prevent heat generated by the coils 17 of the side heating element from being dissipated either by circulation or radiation. When the bottom heating element is depressed, the entire heat emanating from both said lower heating element 21 and the side heating coil 17 will be utilized for heating the cooking utensil and its contents so that a minimum amount of electric current will accomplish the desired results in the processes of cooking.

Of course I do not wish to be limited to the exact details of construction as herein shown, as these may be varied within the limits of the appended claims without departing from the spirit of my invention.

Having thus fully described my invention, what I claim as new and useful is:—

1. In an electric cooking appliance, a heating unit having a well therein, an eye leading to said well, means for electrically heating the interior of the well, means to be temporarily held in a depressed position within the well for automatically ejecting cooking utensils therefrom, said means when elevated functioning as a closure for the well and manually operated means to hold the ejecting means temporarily depressed.

2. In an appliance of the character described, a heating unit having a well therein, an eye opening into said well, means for heating the interior of the well, a movable bottom located within the well and when in its highest position functioning as a closure for said well, means to temporarily hold the bottom depressed in any adjustment to accommodate cooking utensils of various depths, and means for automatically elevating said bottom when the holding means is released.

3. In an appliance of the character described, a heating unit having a space therein for the reception of cooking utensils of various depths, an eye opening into said space, a heating element arranged around the interior walls of said space, a second heating element adapted to move up and down within the space, means for adjusting the second named element in any desired position within the space, and means for automatically elevating said second named element upon release of the adjusting means.

4. In an appliance of the character described, a heating unit having a well therein, ribs arranged vertically around the interior wall of said well for guiding cooking utensils inserted within said well and for conveying heat by conduction and radiation to the cooking utensils, an electric heating coil supported by said ribs forming a side heating element, a bottom heating element for supporting cooking utensils inserted within the well, the last named element being so mounted as to slide vertically up and down within the well, means for holding the last named heating element in any adjustment within the well, and means for automatically moving the bottom heating element upward upon release of the holding means.

5. In an appliance of the character described, a casing forming a heating well having an eye leading to said well, vertical ribs arranged around the inner walls of the casing to serve as guides and heat conductors, a coil supported by said ribs, said coil forming an electric heating element, a second heating element adapted to slide within the well and be secured in any position therein, a plate located immediately beneath the second heating element, a second plate located beneath the first named plate at a distance therefrom, tubes interposed between said plates, bolts passed through said tubes for securing the plates together and supporting the second named element, a cylinder also interposed between said plates, said cylinder being fitted within an extension of the casing so as to slide vertically therein and serve as a guide for the second named heating element, means for automatically elevating the second named heating element, manually operable means for holding the latter in any adjustment within the well the release of which permits said elevating means to function.

6. In combination with the heating unit of an appliance of the character described and the movable heating element thereof, a cylinder, two plates between which said cylinder is located, tubes also located between said plates, bolts extending through said tubes and attached to the movable heating element, said bolts serving to secure the plates upon the tubes and cylinder, a central tube also interposed between the plates, feed wires passed through said central tubes and connected with the movable heating element, a yoke secured to the lower surface of the bottom plate, a rod secured to the yoke, a hollow standard in which said rod is adapted to slide, a set screw threaded through the wall of said standard and adapted to clamp the rod in any adjustment, a connecting rod, one end of which is pivoted to the yoke, an operating bar to which the opposite end of the last named rod is pivoted, a bracket to which the bar is pivoted, and a spring attached to said bar in such manner as to tend to lift the yoke and the parts supported thereby including the movable heating element.

7. In an appliance of the character described, the combination of a side heating element, a movable bottom element adapted to slide up and down within the first named element, means for supporting and guiding the bottom element, a pivoted operating bar, a rod connecting said operating bar with the means for supporting the bottom heating element, a spring, one end of which is attached to said bar, means to which the opposite end of the spring is attached for adjusting the tension of said spring, and a buffer for limiting the upward movement of the bar and serving as a shock absorber for the bar.

8. In an appliance of the character described, an outside casing, an inside casing located concentrically in the inside casing, heat non-conducting material packed in the space between the walls of the two casings, a side heating element located within the inner casing in such manner as to form a heating well for the reception of cooking utensils, a bottom heating element adapted to slide vertically within the well, means for supplying electric current to said heating elements and spring actuated means for raising the bottom heating element.

9. An electric cooking appliance having a well therein, heating means disposed about the sides of said well, an adjustable bottom heating element vertically movable within said well, means to hold said bottom heating element at any predetermined elevation and means to automatically urge said bottom heating element upward upon release of the holding means.

10. An electric cooking appliance provided with a well to receive cooking utensils of various depths, heating means disposed about the sides of said well, an adjustable bottom in said well for disposition contiguous the bottom of any utensil placed in said well, heating means carried by said adjustable bottom, and means to cause said adjustable bottom to ascend and eject a utensil from the well, and means to hold said adjustable bottom at any predetermined elevation.

HARVEY J. LIPHAM.